Jan. 10, 1961    W. H. DU SHANE ET AL    2,967,432
POWER TAKE-OFF SHAFT AND SHIELD ARRANGEMENT
Filed Oct. 6, 1958    2 Sheets-Sheet 1

INVENTORS
W. H. DuSHANE
H. K. KIENZLE

Jan. 10, 1961 W. H. DU SHANE ET AL 2,967,432
POWER TAKE-OFF SHAFT AND SHIELD ARRANGEMENT
Filed Oct. 6, 1958 2 Sheets-Sheet 2
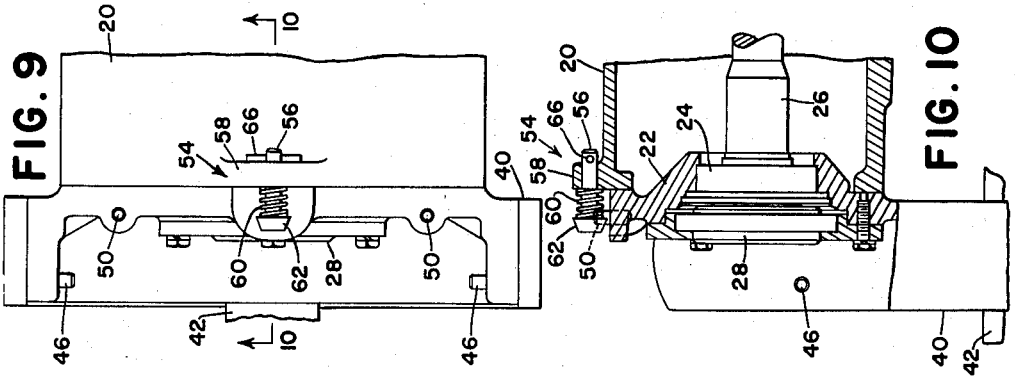
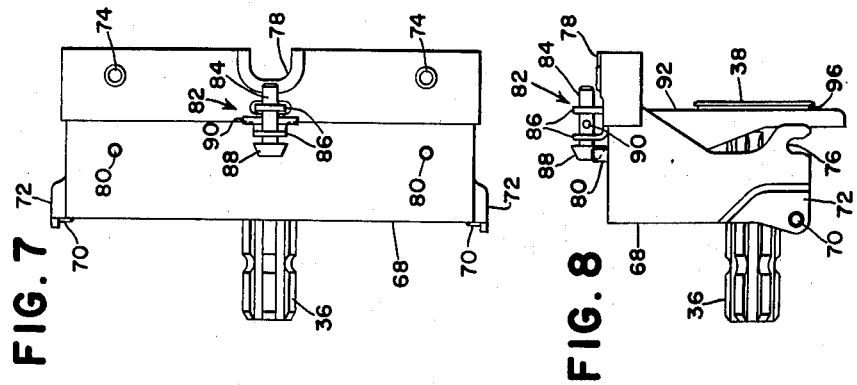
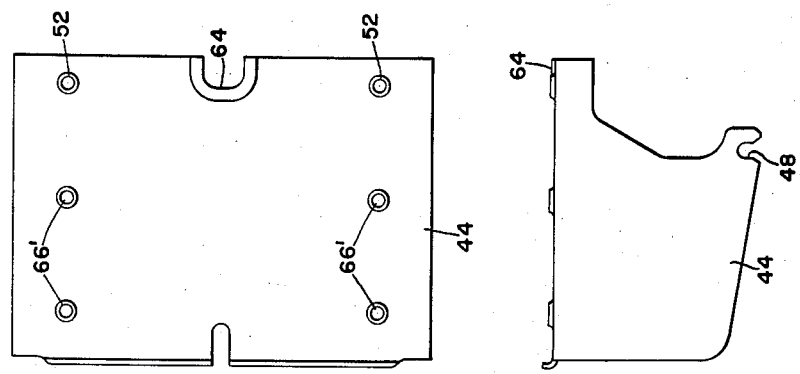
INVENTORS
W. H. DuSHANE
H. K. KIENZLE

United States Patent Office 2,967,432
Patented Jan. 10, 1961

2,967,432
POWER TAKE-OFF SHAFT AND SHIELD ARRANGEMENT

Wallace H. Du Shane and Harold K. Kienzle, Waterloo, Iowa, assignors to Deere & Company, Moline, Ill., a corporation of Delaware Filed Oct. 6, 1958, Ser. No. 765,417

8 Claims. (Cl. 74—15.6)

This invention relates to a power take-off shaft and shield arrangement of the type finding special utility in the agricultural tractor field, wherein the power take-off shaft is used for driving associated implements.

In this respect, cognizance should be taken of the fact that industry-wide standards have been previously set up governing power take-off shafts, the speeds and sizes thereof, the relationships thereof to drawbars, hitchpoints, etc. The first standards pertaining to the power take-off drive for farm tractors were introduced in 1923 and, among other things, established a speed of rotation 540 r.p.m. Standardization of sizes, splines, locations relative to drawbars etc. enables the concomitant establishment of specifications which permitted any standardized power take-off drive implement to be driven by any tractor equipped with a standardized power take-off shaft.

The standards set forth above have existed for thirty-five years but now new standards have been introduced, involving primarily the increase of power take-off speed to 1,000 r.p.m. and the use of a twenty-one-tooth involute-shaped spline in place of the old six-straight-sided spline, plus variations in the location of the shaft relative to hitchpoints, etc.

Although the new standards introduced many and significant advantages, they are not without certain disadvantages, primarily important among which is the requirement that either old implements be adapted to the new standards, especially as to speeds, or the new tractors be equipped with conversion mechanism for reducing the 1,000 r.p.m. speed to the 540 r.p.m. speed for use with old implements. Likewise, the change in the spline for the new standardized shaft means that this spline will not fit couplings built according to the old standards.

The present invention is concerned primarily with the difference in length between the 1,000 r.p.m. shaft and the 540 r.p.m. shaft, because, obviously, a shield capable of protecting the shorter 1,000 r.p.m. shaft will not be long enough to achieve the same protective relation to the longer 540 r.p.m. shaft. Accordingly, the invention aims at the provision of improved shield means, primarily in the nature of an insert shield whereby the main shield, normally used with the shorter shaft, may also be used in conjunction with the insert shield when the long shaft is employed. It is a further feature of the invention to combine the insert shield with the long shaft in such manner that the two must necessarily be used together, whereby the operator cannot inadvertently use the long shaft with the short main shield. Further features reside in novel duplicated attachment and mounting means whereby the shields are readily interchangeable between themselves and the portion of the tractor from which the main power shaft extends and to which power shaft the long and short power take-off shafts are alternately connectible as coaxial extensions.

The foregoing and other important objects and desirable features inherent in and encompassed by the invention will become apparent as a preferred embodiment of the invention is disclosed, by way of example, in the ensuing description and accompanying sheets of drawings, the several figures of which are described immediately below.

Fig. 5 is a plan of the main shield.

Fig. 6 is a side elevation of the main shield.

Fig. 7 is a plan of the combined insert shield and long power take-off shaft.

Fig. 8 is a side elevational view of the structure shown in Fig. 7.

Fig. 9 is a plan view of the part of the tractor incorporating the shield mounting means and the power shaft to which the long and short shafts are alternately attachable.

Fig. 10 is a section generally on the line 10—10 of Fig. 9.

Figure 2:
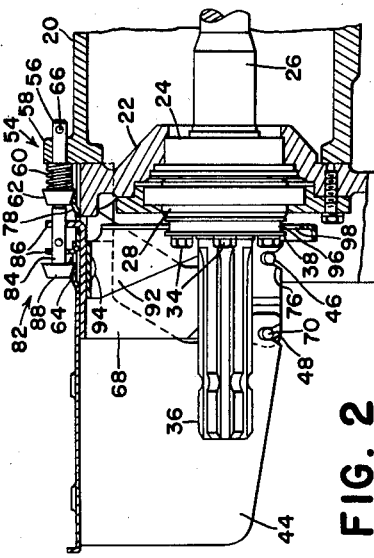
Fig. 2 is a sectional view on the line 2—2—2—2 of Fig. 1.

The preferred embodiment of the invention disclosed herein is discussed in terms of its use at the rear of an agricultural tractor, primarily because that is its main environment; although, the principles of the invention may be applied to other environments. Therefore, the present description should be taken as illustrative and not limiting.

The numeral 20 designates the rear housing portion of a typical agricultural tractor, which supports a bearing carrier 22 for an anti-friction bearing 24 which journals the rear end of a power shaft 26, the rear end of which is exposed at the rear of the carrier 22 as a flat radial flange 28 to which either of two power take-off shafts may be coaxially mounted to serve as an axial extension of the power shaft. One of these power take-off shafts is relatively short and is designated at 30. In the particular example shown, the shaft is provided with an external twenty-one-toothed spline for receiving any suitable coupling whereby the shaft may be connected to an implement (not shown). The shaft has an integral forward radial flange 32 by means of which it may be rigidly connected to the rear radial flange 28 of the power shaft 26 as a coaxial extension of said power shaft. Cap screws 34 are shown as indicative of means that could be used to establish the removable connection. The other shaft is designated by the numeral 36 and, in the embodiment shown, is provided with an external six-toothed spline. The shaft 36 thus differs from the shaft 30 in two respects: first, its external spline is different, and more important, it is considerably longer than the shaft 30, which presents the problem dealt with here.

The shaft 36 has a forward radial flange in the form of a collar 38 by means of which the shaft may be removably coaxially fixed to the rear end flange 28 of the power shaft 26, the cap screws 34 again being used as the connecting means. The collar or flange 38 is preferably fixed to the shaft 36 and in any event is confined against axial separation from the shaft proper.

The housing 20 and associated carrier 22 may be considered as supporting structure at which the rear end 28 of the power shaft 26 is exposed. Allied with this structure, and illustrated merely for purposes of orientation, are a drawbar support 40 and a drawbar 42, illustrated simply to relate the drawbar structure to the power take-off shafts 30 and 36.

Figure 3:
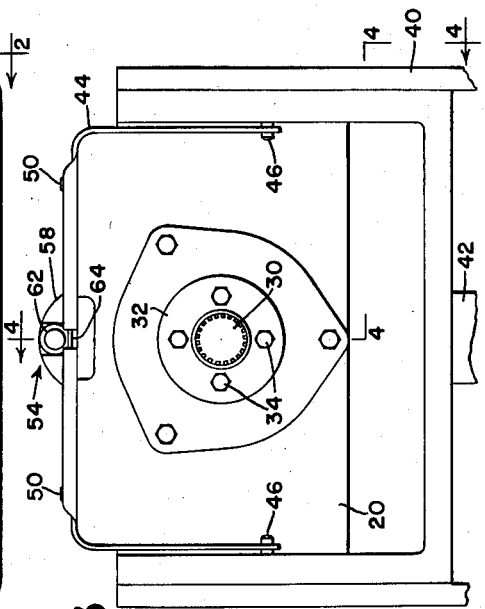
Fig. 3 is a rear elevation like Fig. 1 but of the structure embodying only the main shield and the short shaft.

When the short or 1,000 r.p.m. power take-off shaft 30 is used as a coaxial extension of the power shaft 26 (Figs. 3 and 4), a protective main shield 44 is used to partially enclose the shaft 30 as a safety feature. In general, the shielding of power take-off shafts is a well known expedient and the reasons therefore need not be developed here. Suffice it to note that the shield 44 is of inverted U-shape and extends rearwardly a substantial distance beyond the rear terminal end of the shaft 30. At the same time, the general shape and design of the shield 44 is such as to enable the accommodation of a coupling (not shown) mountable on the spline of the shaft for connection to an implement as suggested above. The supporting structure represented by the tractor housing 20 and allied structure, such as the drawbar support 40, includes first shield-mounting means, here represented by a pair of transversely alined inwardly projecting studs 46 rigidly secured in place. A forward part of the depending sides of the shield 44 is provided with a pair of transversely alined downwardly opening notches 48 which are respectively receivable by the studs 46 to mount the shield 44 when the short shaft 30 is used. Fundamentally, the shield-mounting means and the shield-attachment means represented by the notches 46 are known and are therefore illustrated merely as a representative form of connection between the tractor and the shield 44.

In addition to the studs 46, the tractor structure includes a pair of upstanding studs 50 at the top of the housing (Fig. 9), and the upper part of the shield has a pair of transversely spaced apertures 52 which are respectively received by the studs 50 when the shield 44 is mounted, the shield being mounted by moving it toward the housing 20 so that the notches 48 line up with the studs 46 and so that the apertures 52 line up with the upstanding studs 50, and then moving the shield downwardly. Retention of the shield in this position is secured by releasable lock means designated in its entirety by the numeral 54 and comprising a fore-and-aft movable lock element or pin 56 slidably carried in an apertured ear 58 on the tractor housing 20 and biased rearwardly by a spring 60 so that a conical head 62 on the pin engages a portion 64 at the central upper part of the upper shield 44. A pin 66 through the front of the pin 56 prevents rearward loss of the pin 56. The shield 44 may be removed by manually depressing the pin 56 forwardly against the bias of the spring 60 so that the head 62 frees the shield portion 64, whereupon the shield 44 may be lifted from the studs 46 and 50.

By way of explanation of further uses of the shield 44, which are not material here, the shield has additional rearwardly disposed openings 66'.

Figure 4:
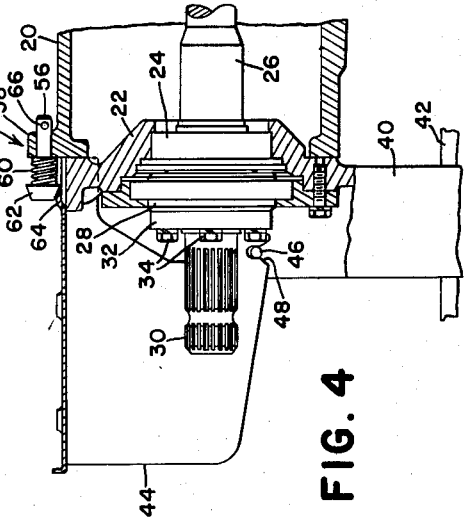
Fig. 4 is a section on the line 4—4—4—4 of Fig. 3.
Figure 1:
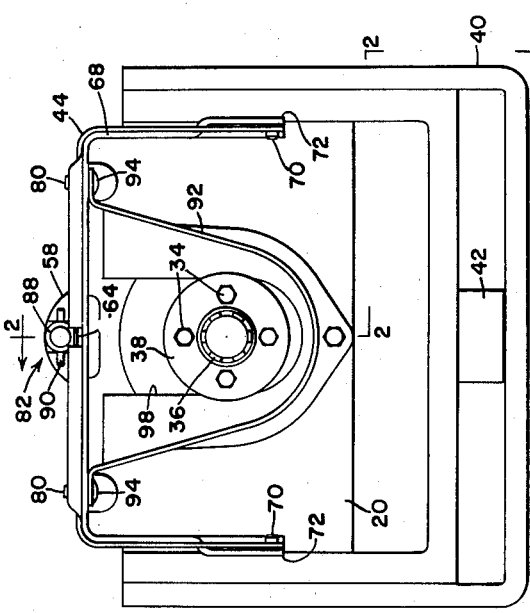
Fig. 1 is a rear elevational view of the shield and shaft arrangement in which both the main and insert shields are used with the long shaft.

A comparison of Figs. 2 and 4 will show that the shield 44, when used by itself, would be inadequate to establish a proper protective relation with the longer 540 r.p.m. shaft 36. Accordingly, the shield 44 is used in conjunction with an insert shield 68. The significant features of the insert shield are, first, it is long enough to combine with the main shield 44 to establish the proper protective relation to the shaft 36; second, it has mounting and attachment means that duplicate those at 46 and 48 and 50 and 52, so that it may be readily adapted for its use as an insert; and, third, it incorporates means requiring that it be positively used with the long shaft 36.

The first of these features will be readily recognized from Fig. 2, wherein it is seen that the added length of the insert 68 to the shield 44 provides the proper protective relation to the long shaft 36. The second feature resides in shield-mounting means comprising a pair of studs 70 which duplicate the studs 46 as to size, transverse spacing and relative level, the insert shield having depending laterally offset portions 72 for achieving this location of the studs 70. Likewise, an upper forward portion of the insert shield has apertures 74 identical to the apertures 52 and similarly located so that when the insert shield 68 is mounted on the tractor, the apertures 74 are received by the tractor studs 50, and depending forward portions of the insert shield have notches 76 identical to the notches 48 in the main shield 44 and thus receivable by the transverse tractor studs 46. As in the case of the main shield 44, the insert shield has a forward portion 78 engageable by the head of the tractor-mounted lock element 56 (Fig. 2). Thus, the insert shield 68 can be mounted on the tractor in the same manner as the main shield 44. Additionally, the main shield 44 may be mounted on the insert shield 68 as an extension of the latter, in which case the main shield notches 48 engage the insert shield studs 70 and the upper forward apertures 52 in the main shield 44 engage a pair of vertical studs 80 on the insert shield and which duplicate the vertical tractor-mounted studs 50.

Still further, the insert shield has lock means, indicated in its entirety by the numeral 82, which is a substantial duplication of the lock means 54 on the tractor, with the exception that the need for a spring like the spring 60 is obviated, as will be explained below. The lock means 82 comprises a shiftable element 84 slidably carried by a pair of apertured ears 86 rigid with an upper central portion of the insert shield 68. The element 84 has a rear head 88 in the form of a truncated cone identical to the head 62 on the element 56 and engageable with the central shield portion 64 of the main shield 44, (Fig. 2). A cross pin 90 insures against loss of the pin or lock element 84. The cooperative relationship between the lock means 54 and 82 is best illustrated in Fig. 2. When the insert shield is mounted on the tractor and the main shield is mounted on the insert shield, the forward end of the insert lock element 84 engages the rear face of the head 62 of the tractor-mounted lock element 56. Consequently, the element 84 partakes of the bias in the spring 60, whereby the spring 60 serves the purpose of moving both elements 56 and 84 rearwardly to their locking positions respectively in engagement with the shield portions 78 and 64. When it is desired to remove the shields, manual pressure forwardly on the element 84 releases the head 88 from the main shield portion 64 and at the same time moves the tractor-mounted lock element 56 forwardly to release its head 62 from the insert shield portion 78.

The third feature, that of requiring the use of the insert shield 68 with the long or 540 r.p.m. shaft 36, comprises the cooperation between the previously described collar 38 and a connector 92 which is affixed to the insert shield in a relatively permanent manner by means of rivets 94. In this particular case, the studs 80 in the insert shield 68 may be enlarged extensions of the stems of the rivets 94. The use of the expression "permanent" as describing the connection of the connector 92 to the insert shield 68 means that any connection, the equivalent of the connection at 94, will be considered permanent as long as it is not readily removable. The purpose of such connections in the power take-off shield art is to prevent the ready separation of the parts that are designed to be used together, thus preventing the user from falling victim to his own indiscretion. At the same time, the connection must be removable, as by destruction, in the event that it is necessary to replace damaged parts. Normally, rivets serve the above described purpose, but normally, welding will not, because substantial destruction of the components is required.

In the present case, the collar 38 has an annular groove 96 which receives a U-shaped cutout 98 in the connector 92. In assembly, the cutout 98 is slid normally to the shaft 36 so that the edges of the cutout are received at diametrically opposed portions of the groove 96 in the collar 38, and thereafter the riveted connections at 94 are established. The size relationship between the groove 96 and the cutout 98 is such that the shaft 36 is freely rotatable with no friction between the collar 38 and connector 92. At the same time, axial and radial separation of the two parts are prohibited unless the rivets 94 are removed or the connector 92 is distorted or destroyed. One reason for the positive connection between the shaft 36 and the insert shield 38 is to guarantee that the two must be used together, which prevents use of the long shaft 36 with the inadequately short main shield 44. That is to say, the shield 44 is adequate when used with the short 1,000 r.p.m. shaft 30 but is inadequate when used alone with the long shaft 36. Therefore, the insert shield 68 has a definite relation to the long shaft as well as to the main shield 44. Likewise, the insert shield 68 cannot be used with the short shaft 30, either alone or in conjunction with the shield 44, in the first of which cases, the insert shield 68 used alone is not long enough to cover the shaft 30 and when used in conjunction with the main shield 44 and the shaft 30 sets up a shield system that is too long and would interfere with the proper secondary shielding and propeller shaft arrangements normally used with power take-off drives.

It will therefore be apparent that the power take-off shaft and shield arrangement disclosed here has taken into consideration the several factors concerned with proper design of the structure from the standpoints of safety, economy of design and ease in use and maintenance. features other than those enumerated, as well as modifications in the preferred embodiment illustrated, may be achieved without departure from the spirit and scope of the invention.

What is claimed is:

1. A power take-off shaft and shield arrangement for a tractor or the like having supporting structure and a power shaft exposed at said structure, comprising: a power take-off shaft extending beyond said structure as a coaxial extension of the power shaft; first shield-mounting means on the structure; a first shield extending away from the structure but terminating short of the length of the power take-off shaft so as to lie in partially protective relation to said power take-off shaft; attachment means on the shield detachably engageable with said first shield mounting means to normally mount said shield; second shield-mounting means on the first shield and duplicating said first shield-mounting means; a second shield disposed as an extension of the first shield to complete the protective relation to the power take-off shaft; and attachment means on the second shield detachably engageable with the second shield-mounting means and duplicating the first shield attachment means.

2. The invention defined in claim 1, in which: the power take-off shaft is separate from the power shaft and includes detachable connection means cooperative with said power shaft to selectively mount and dismount the power take-off shaft; and means is provided to connect the power take-off shaft to the first shield so that said first shield and power take-off shaft must be used together.

3. The invention defined in claim 2, in which: said last-named means includes a collar on the power take-off shaft and having an annular groove therein, and a connector on the first shield and received in said groove.

4. The invention defined in claim 1, including: first lock means comprising a lock element on the support and a lock-engaging portion on the first shield and a spring biasing said element to a locked position engaging said portion and yieldable to enable shifting of said element to a released position freeing said portion; and second lock means comprising a second lock-element on the first shield and a second lock engaging portion on the second shield, said second element being arranged to engage the first element to partake of the spring-biased movement of the first element to its locked position whereby said second element achieves a locked position engaging said second shield portion and so that movement of said second element to a released position freeing said second shield portion automatically incurs movement of the first element to its released position.

5. A power take-off shaft and shield arrangement for a tractor or the like having supporting structure and a power shaft exposed at said structure, comprising: a power take-off shaft extending beyond said structure as a separable coaxial extension of the power shaft; detachable connection means cooperative between the shafts to selectively mount and dismount the power take-off shaft; first shield-mounting means on the structure; a first shield extending away from the structure but terminating short of the length of the power take-off shaft so as to lie in partially protective relation to said power take-off shaft; attachment means on the shield detachably engageable with said first shield mounting means to normally mount said shield; second shield-mounting means on the first shield; a second shield disposed as an extension of the first shield to complete the protective relation to the power take-off shaft; attachment means on the second shield detachably engageable with the second shield-mounting means; and means connecting the power take-off shaft to the first shield so that said first shield and power take-off shaft must be used together.

6. A power take-off shaft and shield arrangement for a tractor or the like having supporting structure and a power shaft exposed at said structure, comprising: a power take-off shaft extending beyond said structure and driven by the power shaft; detachable connection means cooperative between the shafts to selectively mount and dismount the power take-off shaft; first shield-mounting means on the structure; a first shield extending away from the structure but terminating short of the length of the power take-off shaft so as to lie in partially protective relation to said power take-off shaft; attachment means on the shield detachably engageable with said first shield mounting means to normally mount said shield; second shield-mounting means on the first shield; a second shield disposed as an extension of the first shield to complete the protective relation to the power take-off shaft; attachment means on the second shield detachably engageable with the second shield-mounting means; and means connecting the power take-off shaft to the first shield so that said first shield and power take-off shaft must be used together.

7. A power take-off shaft and shield adapter of the class described, comprising: a power take-off shaft having means for the coaxial attachment thereof to a power shaft and further having a collar fixedly mounted thereon against normal axial removal and including an annular groove; a shield adjacent to said shaft; and a connector affixed to the shield and having a U-shaped slot embracing and received in the groove to prevent normal axial and radial separation of said shaft and shield, said slot being elongated in one dimension thereof to enable limited radial displacement of the shield relative to the shaft.

8. A power take-off shaft and shield arrangement for a tractor or the like having supporting structure comprising: a power take-off shaft extending beyond said structure; first shield-mounting means on the structure; a first shield extending away from the structure but terminating short of the length of the power take-off shaft so as to lie in only partially protective relation to said power take-off shaft; attachment means on the shield detachably engageable with said first shield-mounting means to normally mount said shield; second shield-mounting means on the first shield; a second shield disposed as an extension of the first shield to complete the protective relation to the power take-off shaft; and attachment means on the second shield detachably engageable with the second shield-mounting means and so constructed as to support the second shield exclusively on and as a rigid cantilever extension of the first shield.

References Cited in the file of this patent

UNITED STATES PATENTS

| | | |
|---|---|---|
| 1,529,642 | Callahan | Mar. 10, 1925 |
| 2,410,503 | Johnson | Nov. 5, 1946 |
| 2,612,763 | Hansen | Oct. 7, 1952 |
| 2,684,256 | Krukowski | July 20, 1954 |
| 2,795,969 | McCarthy | June 18, 1957 |
| 2,817,408 | Klemm | Dec. 24, 1957 |
| 2,858,680 | Harrington | Nov. 4, 1958 |